US007526476B2

(12) United States Patent
Naam et al.

(10) Patent No.: US 7,526,476 B2
(45) Date of Patent: Apr. 28, 2009

(54) SYSTEM AND METHOD FOR GENERATING ATTRIBUTE-BASED SELECTABLE SEARCH EXTENSION

(75) Inventors: Ramez Naam, Seattle, WA (US); Christopher B. Weare, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 480 days.

(21) Appl. No.: 11/078,590

(22) Filed: Mar. 14, 2005

(65) Prior Publication Data
US 2006/0206475 A1 Sep. 14, 2006

(51) Int. Cl.
*G06F 7/00* (2006.01)
*G06F 17/30* (2006.01)

(52) U.S. Cl. .......................................................... 707/5
(58) Field of Classification Search ........................ None
See application file for complete search history.

(56) References Cited

U.S. PATENT DOCUMENTS

| 5,987,446 | A | * | 11/1999 | Corey et al. ..................... 707/3 |
| 6,012,053 | A | * | 1/2000 | Pant et al. ....................... 707/3 |
| 6,549,907 | B1 | * | 4/2003 | Fayyad et al. ................. 707/101 |
| 6,615,248 | B1 | * | 9/2003 | Smith .......................... 709/217 |
| 6,629,097 | B1 | * | 9/2003 | Keith ............................. 707/5 |
| 6,947,930 | B2 | * | 9/2005 | Anick et al. .................... 707/5 |
| 2003/0033300 | A1 | * | 2/2003 | Bergman et al. ................ 707/5 |
| 2003/0126235 | A1 | * | 7/2003 | Chandrasekar et al. ....... 709/220 |
| 2004/0093321 | A1 | * | 5/2004 | Roustant et al. ................. 707/3 |
| 2005/0010599 | A1 | * | 1/2005 | Kake et al. ................ 707/104.1 |
| 2005/0120114 | A1 | * | 6/2005 | Nadamoto et al. ........... 709/225 |
| 2006/0122968 | A1 | * | 6/2006 | Naam ............................. 707/3 |
| 2008/0165744 | A1 | * | 7/2008 | Forssell .......................... 707/3 |

OTHER PUBLICATIONS

"Google Web Search Features", archived at archive.org on Nov. 25, 2008, Google, 7 pages.*

* cited by examiner

*Primary Examiner*—Luke S. Wassum
*Assistant Examiner*—James E Richardson
(74) *Attorney, Agent, or Firm*—Shook, Hardy & Bacon LLP

(57) ABSTRACT

A system and related techniques generate alternative search terms derived from a set of search results. A user may input a set of search terms such as keywords or other inputs, and receive a set of search results back. In addition, the set of search results may have a set of selectable alternative search links associated thereto. The association of each selectable alternative search link and the set of search results depends on the evaluated distinctiveness of alternative information content of a search result Web page against other search results. In embodiments an attribute or attribute of a result may be assessed for inclusion as an alternative search attributes based on the attribute's deviation from an average of the attributes of the set of search results. A user may select the alternative search suggestion and be presented with an updated set of search results related to the alternative search attributes.

20 Claims, 4 Drawing Sheets

SYSTEM AND METHOD FOR GENERATING ATTRIBUTE-BASED SELECTABLE SEARCH EXTENSION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computerized information retrieval, and more particularly to a system and method for generating and presenting a set of selectable search extensions to a user based on attributes appearing in search results.

BACKGROUND OF THE INVENTION

The widespread use and growth of search services on the Internet and other networks has led to a desire for increasing quality and accuracy in search services and results. A number of search engines or services hosted on the public Internet, as for example illustrated in FIG. 1, allow users to enter search terms of interest to receive a set of search results in order of estimated relevance, so that the user may click a link or otherwise select Web sites or other hits of interest. Some search services likewise attempt to provide an enhanced search experience by way of search extensions or corrections, for instance to a suggested alternate search term with verbiage such as "did you mean" when the user has made a typographical error, along with the updated term with correct spelling.

However, in some search activity a user may have the intention of locating Web pages, files or other media or results which share or are based on common attributes or characteristics, as well as containing information related to their inputted search terms. For instance, a user may enter a set of search terms such as "car dealers Seattle WA" in hopes of finding a set of retail automobile outlets in their local area. Existing search engines may be able to return some grouping of car dealers in some geographic region. However, the user may, for instance, wish to only view those retail car Web sites which contain digital photographs of automobile models in stock, for instance in JPG (joint photographic experts group) or other format. Or the user may wish to locate a local or other restaurant whose menu may be encoded on a Web page, for instance in Adobe PDF™ or other format.

However, even those search services which attempt to offer a user spell-corrected or other search corrections offer no facility for identifying search results within certain categories of attributes or types, for instance to extend a search to all Web sites or other sources which contain the relevant search terms along with a PDF file, an image file, which contain those terms in a title, or other characteristics, attributes, features or other metadata or information which may characterize a relevant subset of the user's results. Other problems in search technology exist.

SUMMARY OF THE INVENTION

The invention overcoming these and other problems in the art relates in one regard to a system and method for generating a set of attribute-based search extensions, in which a user may enter a set of search terms via an Internet-based or other search service, which service may generate a set of search results based on a comparison of those search terms to a Web page index or other content source. In addition to transmitting the set of search results back to the user in hyperlink or other form, according to embodiments of the invention the user may likewise be presented with clickable or otherwise selectable search extensions which key on attributes of one or more results. For instance, the user may be presented with a selectable link indicating "show me more with titles like this" associated with a result whose title contains the user's inputted search terms, or indicating "show me more PDFs like this" associated with a result having an embedded or related file or attachment of that type. According to embodiments of the invention in one regard, the search service may analyze the set of search results to identify attributes which may represent significant or distinctive characteristics related to the given result, for instance by measuring the distance in a feature space from an average of a set of attributes measured on all pages within the set of search results, or otherwise. When a user clicks or otherwise selects a "more like this" or other alternative search extension or refinement, the search service may update the set of search results to present only those with PDF files, image files, Web pages whose title contains the search terms, or other selected attributes. In this fashion users may focus or refine their search activity to potential sources having characteristics most closely matching their search intent.

DETAILED DESCRIPTION OF EMBODIMENTS

Figure 1:
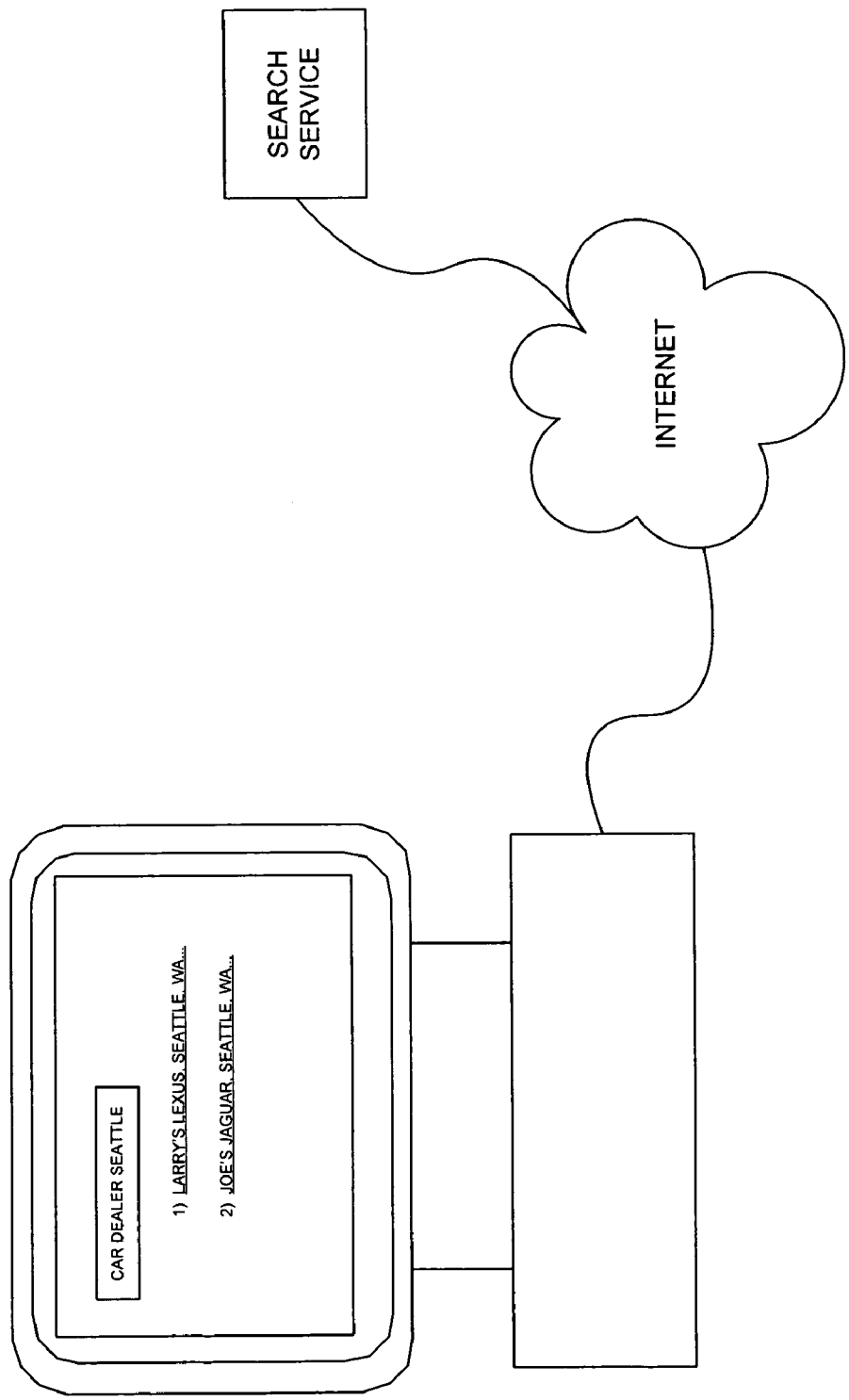
FIG. 1 illustrates a search service platform, according to known technology.
Figure 2:
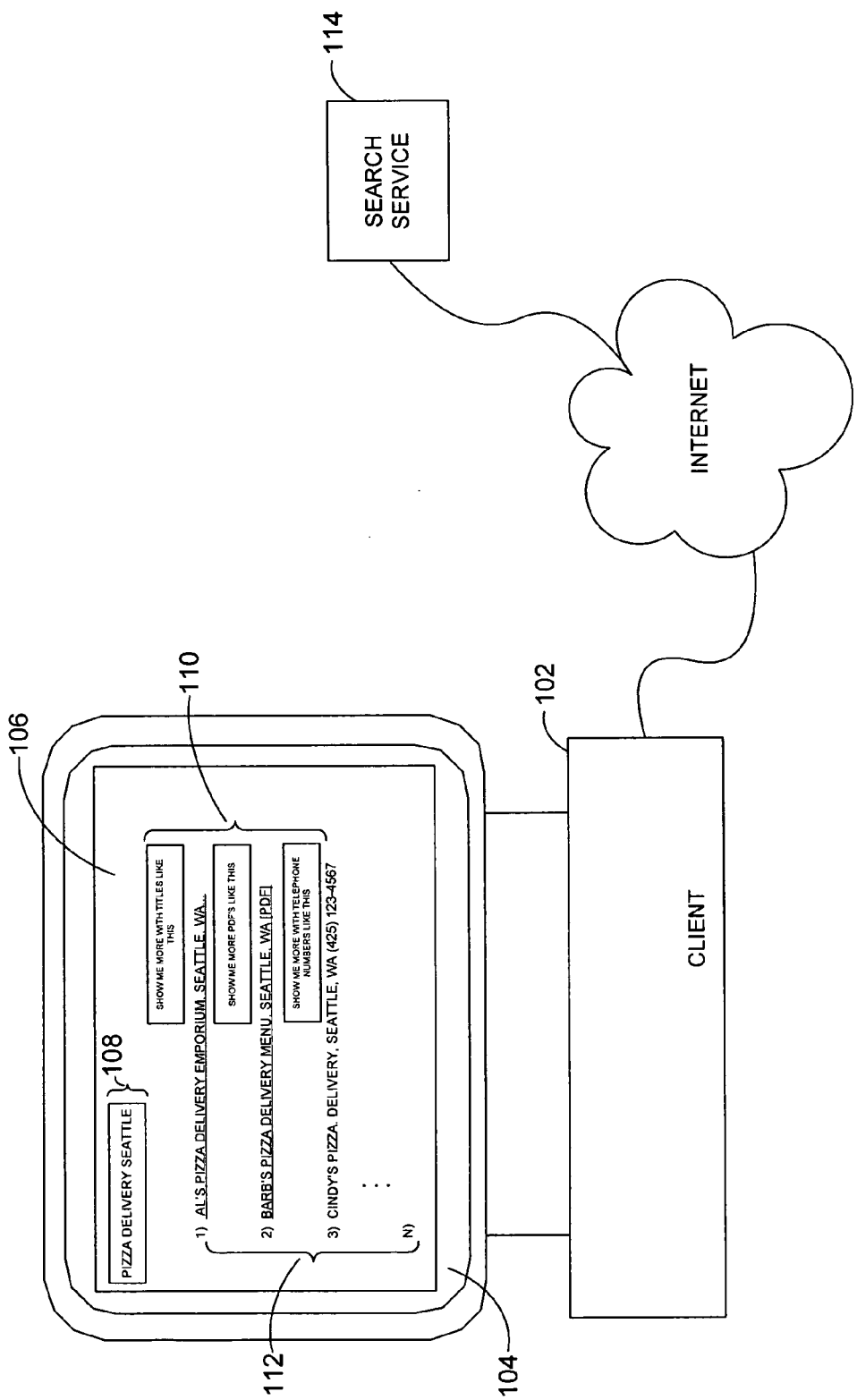
FIG. 2 illustrates a search service including attribute-based alternative search extensions, according to embodiments of the invention.

FIG. 2 illustrates an environment in which a system and method for generating attribute-based search extensions may operate, according to embodiments of the invention. As illustrated in that figure a user may operate a client 102 such as a personal computer, personal digital assistant, network-enabled cellular telephone or other client or device to perform search and other activity. The client 102 may present a user interface 104 such as a graphical user interface, command-line interface, voice-activated or other interface to allow the user to navigate for example to a search page 106 associated with a search service 114 on the Internet or other public or private network.

The search page 106 may present a dialogue box or other input mechanism to accept search input 108 from the user. The search input 108 may be or include, for example, key words, numbers or other alphanumeric or other data reflecting topics or content of interest to the user. The search input 108 may in general be transmitted to search service 114 to execute a query or search against stored content, for instance an index of Web pages or other content or sources. The search service 114 may return a set of search results 112 reflecting Web pages or other documents, content or information which contains or is associated with the search input 108. To facilitate carrying out the operations of executing a query, searching against stored content, and returning the set of search results 112, as discussed above, the search service 114 comprises a processor coupled to a computer storage medium, wherein the computer storage medium has a plurality of computer software components stored thereon that are executable by the processor. The set of search results 112 may be presented in the form of links to Web pages or other sites reflecting matching content to the search input 108, which links or other identifiers may be presented in ranked order of estimated relevance to the search input 108 and/or the user's search objectives or intent. Clicking through or otherwise activating a universal resource locator (URL), link or other identifier for a result may navigate the user to that Web site or other destination, to view that document or content for information of interest.

According to embodiments of the invention in a further regard, the set of search results 112 may also have associated with it a set of attribute-based selectable search extensions 110. The attribute-based selectable search extensions 110 may be presented as illustrated as optional links or other activatable objects placed or hovered over or otherwise associated with one or more result in the set of results 112. The attribute-based selectable search extensions 110 may in general invite the user or viewer to select, activate or link to a further set of results which are extended, conditioned or refined according to defined characteristics or attributes present in the results. For example as shown, when a user's search input 108 is found within the title of a Web site or other result, the selectable search extension may indicate "show me more with titles like this". For further example, a result consisting of, containing, attaching or otherwise having an associated Adobe PDF™ file may display an associated selectable search extension indicating "show me more PDFs like this", or results containing an identifiable telephone number may display an extension indicating "show me more with telephone numbers like this". Selectable extensions based on other attributes or characteristics are possible. By identifying attributes or metadata of the results or underlying Web pages or other source content, embodiments of the invention may thus permit a user to focus or refine their search based on those characteristic attributes when they are of interest. For example as illustrated, a user whose search input 108 consists of "pizza delivery Seattle" may be presented with a set of attribute-based selectable search extensions 110 including "show me more PDFs like this" or other attributes as shown, for instance on the assumption that Web pages consisting of or containing that type of file may be more likely to include a viewable menu or other information consistent with the user's search intent.

Figure 3:
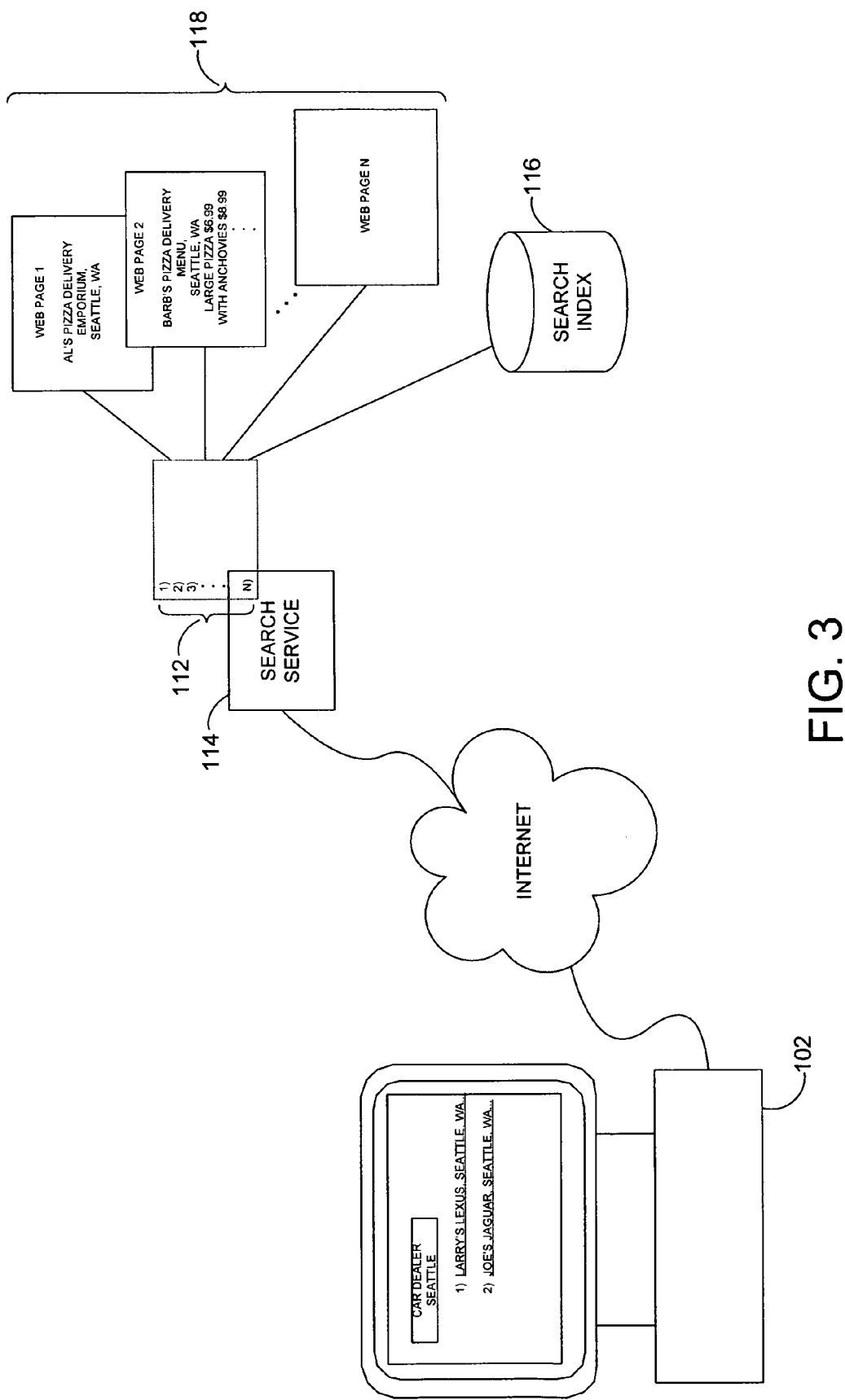
FIG. 3 illustrates a search service including attribute-based search extensions, according to embodiments of the invention in another regard.

According to embodiments of the invention in more regards, and as illustrated for instance in FIG. 3, a search service 114 or other search logic according to embodiments of the invention may receive the search input 108 and execute a comparison, query or report against a search index 116, such as an inverted index of words populating Web pages, or other set of content sources 118. The search index 116 may store or access a set of attributes related to some or all of the set of content sources 118 to identify attributes of Web pages or other content appearing in the set of search results 112 which may be of interest to the user. According to embodiments of the invention in one regard, the set of attributes associated with some or all of the Web pages or other documents or sources in the set of content sources 118 may include or contain, for example:

Relevance rank within set of results 112;
Depth within Internet or other network domain;
Evaluated quality of overall match to search input 108;
Freshness or currency of result or content;
Presence of exact match to search input 108;
Presence of all possible subphrases or subsets of search input 108;
quality of match in title;
quality of match in body;
quality of match in URL;
quality of match in the anchor text;
File type;
Top level domain which result is located in.

Other attributes, characteristics, metadata or identifiers are possible. Those attributes may in implementations be extensible or updateable, and may in embodiments be dynamically adjustable or filterable by search service 114 or other search logic or operator, for instance depending on search input 108 or other factors. According to embodiments of the invention in one regard, each Web page or other source in the set of content sources 118 may for example be assigned a point in a 12-dimensional (as illustratively enumerated above) or other dimensional space characterizing the nature of that source's attributes, including outliers. For example, for each Web page or other source in the set of content sources 118 an axis may be identified which shows the greatest deviance from the average of all results in the set of results 112. Thus for instance, if a user's search input 108 generated only one Web page containing the search input 108 in the title of that source, that result may constitute an outlier on the axis of "title" in the attribute space.

In that case, the search service 114 may display a link in the set of search results 112 next to or associated with that result indicating for instance "more good matches in title". If the user selects or activates that link, the search service 114 or other search or search extension logic may for example reissue or refine the query to isolate additional results containing matching content in the title, for instance by placing additional weight on the "title" field in relevance computations, or otherwise filtering on the "title" attribute. Selectable extensions in the set of attribute-based selectable search extensions 110 may in embodiments be labeled or presented with different messages, which may in embodiments omit reference to the attribute being used to key the refinement, with indications such as "more like this". Other annotations or messages are possible.

According to embodiments of the invention in a further illustrative regard, if the search input 108 contains a three-term query such as "Joe Smith Microsoft", the search service 114 may present Web pages or other results in the set of results 112 containing a high incidence of matches on the subset "Joe Smith" with a selectable extension of "more like Joe Smith", to permit the user to mine those results reflecting that high incidence of potentially relevant content. Other types of attributes as well as techniques for identifying candidate attributes for inclusion in the set of attribute-based selectable search extensions 110 are possible.

Figure 4:
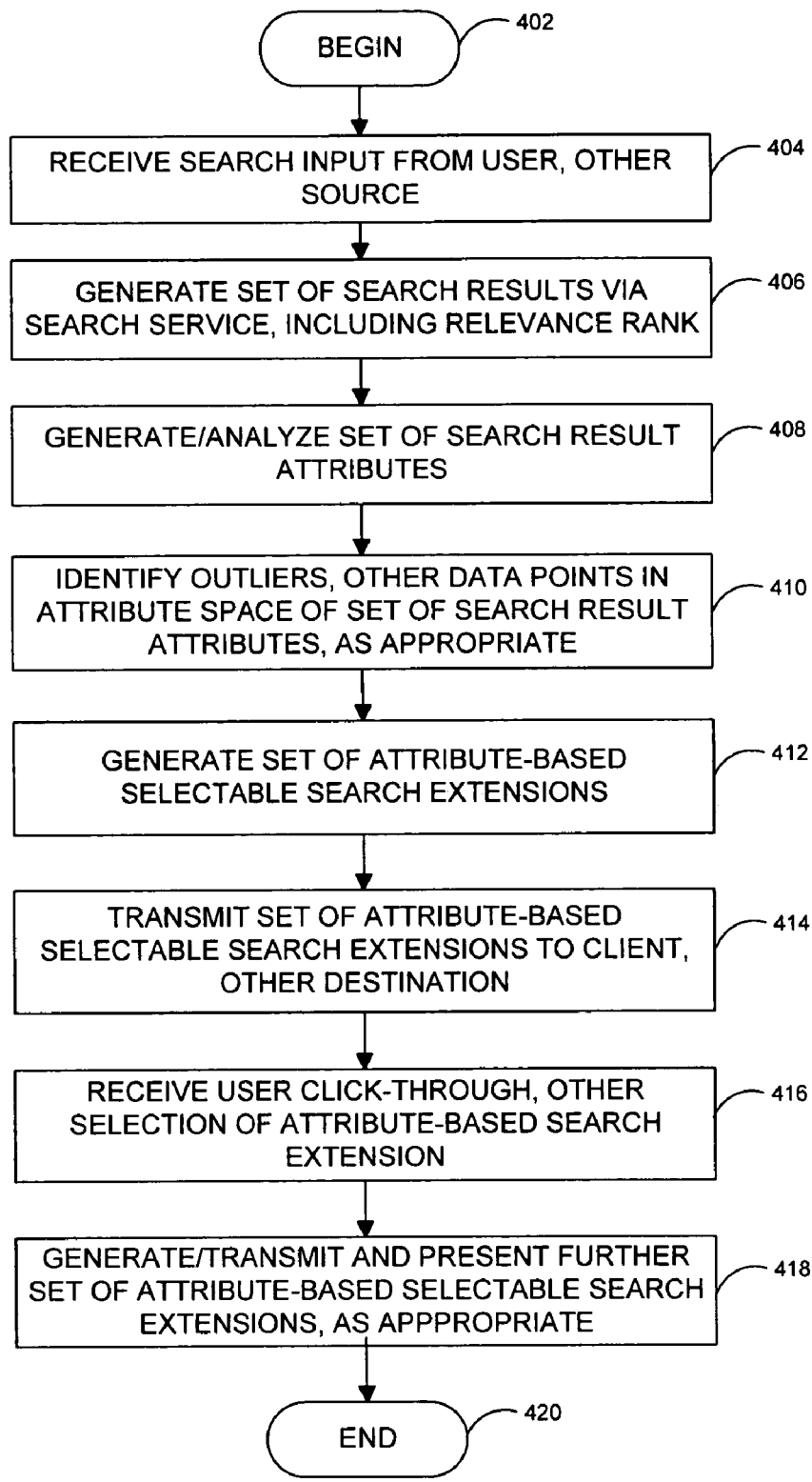
FIG. 4 illustrates a flowchart of overall attribute-based search extension processing, according to embodiments of the invention.

Overall attribute-based alternative search extension processing is illustrated in FIG. 4. In step 402, processing may begin. In step 404, search input 108, such as key words, numbers or other search information may be received from a user or other source. In step 406, the set of search results 112 based on the search input 108 may be generated by or via search service 114 or other search engine or resource, including a listing in rank of estimated relevance or otherwise.

In step 408, the search service 114 or other search logic may generate or analyze the set of attributes reflected in the set of search results 112 to identify or isolate significant, outlying or otherwise characteristic or distinctive attributes of a given Web page or other result or hit. In step 410, one or more outlying or other attributes for a given Web page or other hit or result may be identified or isolated in the attribute space of the set of attributes related to the set of search results 112, as appropriate. For instance distance from the average Euclidean or other distance on an axis in attribute space may be measured for a given Web page, for example to calculate that the presence of a PDF file or attachment has only occurred in 5% of the set of search results 112. A Euclidean or other distance from the center of gravity of an aggregate of the whole set of attributes presented in the set of search results 112 may also be used to identify outlying attributes or attributes otherwise of interest, to evaluate for inclusion in the set of attribute-based selectable search extensions 110. In embodiments attributes for a Web page or other result may be included when those or other metrics exceed a threshold, generally indicating that the attribute may be distinctive, characteristic or otherwise of interest.

In step 412, the set of attribute-based selectable search extensions 110 related to the set of search results 112 may be generated based on metrics identifying outliers, or other indicators for attributes associated with one or more individual results. In step 414, the set of attribute-based selectable search extensions 110 may be transmitted to the client 102 along or in conjunction with the set of search results 112, or to other destinations. In step 416, the click-through or other action or selection on a link or other object in the set of attribute-based selectable search extensions 110 may be received by or via search service 114 or otherwise. In step 418, a further set of search results based on the user's selected attribute or attributes, such as Web sites containing keywords in the title, may be transmitted to the user along with an updated set of attribute-based selectable search extensions 110 derived from those further results, as appropriate. In step 420, processing may repeat, return to a prior processing point, jump to a further processing point or end.

The foregoing description of the invention is illustrative, and modifications in configuration and implementation will occur to persons skilled in the art. For instance, while the invention has generally been described in terms of a set of attribute-based selectable search extensions 110 in which an individual result may present one link based on one attribute, in embodiments more the link presented with a given result may be based on two or more attributes, for instance indicating "show me more with titles like this and PDFs" or otherwise multiple attributes.

Similarly, while the invention has in embodiments been described as generating the set of search results 112 based on one search service 114 or one search index 116, in embodiments multiple search services, engines, indices or other search sources, content or logic may be used. Further, while the invention has generally been described as involving a search service 114 which searches content on the Internet or other network, in embodiments the search logic and attribute-based search extensions may be generated for other search sources or content, for instance local or desktop search on a user's hard drive or other storage or media. Other hardware, software or other resources described as singular may in embodiments be distributed, and similarly in embodiments resources described as distributed may be combined. The scope of the invention is accordingly intended to be limited only by the following claims.

We claim:

1. A computing system capable of generating attribute-based selectable search extensions, the computing system comprising a processor coupled to a computer storage medium, the computer storage medium having stored thereon a plurality of computer software components executable by the processor, the computer software components comprising:
   an input interface component to receive a set of search terms;
   a search extension logic configured for performing a method comprising:
      communicating with the input interface component to receive the set of search terms;
      accessing a set of initial search results based on the set of search terms; and
      identifying at least one attribute of at least one result in the set of initial search results, wherein the at least one attribute identifies a formatting of the at least one result; and
      generating a set of attribute-based selectable search extensions associated with the set of initial search results that reflect outlying attributes within the set of initial search results, wherein generating comprises:
         (1) assigning the at least one attribute a point in attribute space, wherein the attribute space is defined by axes that are each associated with a respective attribute identified within the set of initial search results, and wherein at least one of the axes represents the formatting;
         (2) comparing the point associated with the at least one attribute of the at least one result in the set of initial results against an average of points, each associated with attributes identified within other results in the set of initial search results, along an axis of the axes within the attribute space to determine a distance from the average of points;
         (3) comparing the distance against a threshold; and
         (4) identifying the at least one attribute as one of the outlying attributes based on the comparison.

2. The computing system according to claim 1, wherein the set of search terms are received via at least one of a networked search service and desktop search on local storage.

3. The computing system according to claim 1, wherein the set of attribute-based selectable search extensions comprises at least one selectable link associated with the at least one result in the set of initial search results.

4. The computing system according to claim 1, wherein the set of attribute-based selectable search extensions comprises search extensions based on attributes of at least one of file type, presence of image data, match in result title, quality of match, freshness of match, presence of address data and presence of contact data.

5. The computing system according to claim 1, wherein selection of at least one of the set of attribute-based selectable search extensions initiates further search processing to generate search results conditioned on the identified format characteristic of the at least one identified attribute.

6. The computing system according to claim 5, wherein the further search processing generates search results conditioned on two or more identified attributes.

7. A method for generating attribute-based selectable search extensions, wherein a processor is provided to carry out the method comprising:
   receiving a set of search terms;
   accessing a set of initial search results based on the set of search terms;

identifying at least one attribute of at least one result in the set of initial search results, wherein the at least one attribute identifies a type of file associated with the at least one result; and generating a set of attribute-based selectable search extensions associated with the set of initial search results that reflect outlying attributes within the set of initial search results, wherein generating comprises:

(1) assigning the at least one attribute a point in attribute space, wherein the attribute space is defined by axes that are each associated with a respective attribute identified within the set of initial search results, and wherein at least one of the axes represents the type of file;

(2) comparing the point associated with the at least one attribute of the at least one result in the set of initial results against an average of points, each associated with attributes identified within other results in the set of initial search results, along an axis of the axes within the attribute space to determine a distance from the average of points;

(3) comparing the distance against a threshold; and (4) identifying the at least one attribute as one of the outlying attributes based on the comparison.

8. The method according to claim 7, wherein the set of search terms are received via at least one of a networked search service and desktop search on local storage.

9. The method according to claim 7, wherein the set of attribute-based selectable search extensions comprises at least one selectable link associated with the at least one result in the set of initial search results.

10. The method according to claim 7, wherein the set of attribute-based selectable search extensions comprises search extensions based on attributes of at least one of file type, presence of image data, match in result title, quality of match, freshness of match, presence of address data and presence of contact data.

11. The method according to claim 7, further comprising initiating further search processing to generate search results conditioned on the identified format characteristic of the at least one identified attribute based on a selection of at least one of the set of attribute-based selectable search extensions.

12. The method according to claim 11, wherein the further search processing generates search results conditioned on two or more identified attributes.

13. A computerized method for generating a set of attribute-based selectable search extensions, the computerized method comprising:

communicating with an input interface component to receive a set of search terms;

accessing a set of initial search results based on the set of search terms;

identifying at least one attribute of a web page in the set of initial search results based on content within the web page, wherein the at least one attribute identifies metadata underlying the web page;

generating a set of attribute-based selectable search extensions associated with the set of initial search results that reflect outlying attributes within the set of initial search results, wherein generating comprises:

(1) assigning the at least one attribute a point in attribute space, wherein the attribute space is defined by axes that are each associated with a respective attribute identified within the set of initial search results, and wherein at least one of the axes represents the formatting of the web page;

(2) comparing the point associated with the at least one attribute of the web page in the set of initial results against an average of points, each associated with attributes identified within other results in the set of initial search results, along an axis of the axes within the attribute space to determine a distance from the average of points; and (3) comparing the distance against a threshold:

determining whether the at least one attribute is distinctive based on the comparison; and when the at least one attribute is distinctive, generating an attribute-based selectable search extension therefrom.

14. The computerized method according to claim 13, further comprising transmitting the attribute-based selectable search extension to a user-interface component for presentation to a user.

15. The computerized method according to claim 13, wherein generating a set of attribute-based selectable search extensions associated with the set of initial search results further comprises:

comparing the at least one attribute of the web page against one or more attributes associated with other web pages in the set of initial search results;

assigning the web page a point in attribute space, wherein the location of the point characterizes the nature of the at least one attribute within the web page, wherein the attribute space is defined by axes that are each associated with a respective attribute identified within the set of initial search results, and wherein at least one of the axes represents the underlying metadata;

determining a deviance of the point against an average of points, assigned to the other web pages in accordance with the one or more attributes associated with the other web pages, along an axis of the axes within the attribute space; and comparing the deviance against a threshold to determine whether to select the at least one attribute within the web page for inclusion in the set of attribute-based selectable search extensions.

16. The computerized method according to claim 15, wherein a number of dimensions provided in the attribute space corresponds to the number of attributes identified.

17. The computerized method according to claim 15, wherein determining whether the at least one attribute is distinctive based on the comparison further comprises calculating comparative metrics for the at least one attribute and evaluating whether the comparative metrics exceed a threshold, the threshold based on an aggregation of similar attributes identified from the other web pages.

18. The computing system according to claim 3, wherein the set of attribute-based selectable search extensions are presented to a user as the at least one selectable link labeled with a message of the identified format characteristic.

19. The method according to claim 9, wherein the set of attribute-based selectable search extensions are presented to a user as the at least one selectable link labeled with a message of the identified format characteristic.

20. The computing system according to claim 18, wherein the method performed by the search extension logic further comprises:

receiving a click-through at the at least one selectable link;

refining the received set of search terms with the identified format characteristic;

reissuing a search with the refined set of search terms to receive a further set of search results; and transmitting to the user the further set of search results along with an updated set of attribute-based selectable search extensions derived from the further set of search results.

* * * * *